(12) United States Patent
Jiang et al.

(10) Patent No.: US 8,196,359 B1
(45) Date of Patent: Jun. 12, 2012

(54) WIND TURBINE SYSTEM

(75) Inventors: Shugnang Jiang, Omaha, NE (US);
John L. Walker, Omaha, NE (US);
Meian Zhang, Omaha, NE (US)

(73) Assignee: American Home Energy Innovations, LLC., Omaha, NE (US)

( * ) Notice: Subject to any disclaimer, the term of this patent is extended or adjusted under 35 U.S.C. 154(b) by 329 days.

(21) Appl. No.: 12/697,318

(22) Filed: Feb. 1, 2010

Related U.S. Application Data

(60) Provisional application No. 61/151,017, filed on Feb. 9, 2009.

(51) Int. Cl.
*E04H 12/00* (2006.01)
*E04C 2/52* (2006.01)

(52) U.S. Cl. .................. 52/173.1; 52/220.8; 416/DIG. 6

(58) Field of Classification Search ........... 52/40, 173.1, 52/219, 220.8
See application file for complete search history.

(56) References Cited

U.S. PATENT DOCUMENTS

| | | | | |
|---|---|---|---|---|
| 843,375 | A * | 2/1907 | Thompson | 126/317 |
| 1,210,217 | A * | 12/1916 | Schodde | 126/314 |
| 1,613,547 | A * | 1/1927 | Telford | 237/1 R |
| 1,924,033 | A * | 8/1933 | Flor | 52/149 |
| 3,084,769 | A * | 4/1963 | Collier | 52/114 |
| 4,421,967 | A * | 12/1983 | Birgel et al. | 219/631 |
| 5,419,683 | A * | 5/1995 | Peace | 416/227 A |
| 5,454,197 | A * | 10/1995 | Horrigan | 52/199 |
| 6,237,888 | B1 * | 5/2001 | Coll | 248/539 |
| 6,948,905 | B2 * | 9/2005 | Horjus | 415/4.2 |
| 7,084,520 | B2 | 8/2006 | Zambrano | |
| 7,276,809 | B2 | 10/2007 | Zambrano | |
| 7,472,718 | B2 * | 1/2009 | Ball | 137/295 |
| 7,510,366 | B2 * | 3/2009 | Okubo et al. | 415/4.4 |
| 7,818,928 | B2 * | 10/2010 | Brunt et al. | 52/218 |
| 7,880,323 | B2 * | 2/2011 | Menges | 290/55 |
| 2002/0108328 | A1 * | 8/2002 | Richardson | 52/220.8 |
| 2005/0180851 | A1 | 8/2005 | Gordon | |
| 2006/0120872 | A1 * | 6/2006 | Okubo et al. | 416/132 B |
| 2006/0137348 | A1 * | 6/2006 | Pas | 60/641.1 |
| 2007/0176431 | A1 | 8/2007 | Graham, Sr. | |
| 2007/0193141 | A1 * | 8/2007 | Warmolts et al. | 52/219 |
| 2007/0284885 | A1 * | 12/2007 | Menges | 290/55 |
| 2009/0186745 | A1 * | 7/2009 | Lewiston | 482/2 |

(Continued)

FOREIGN PATENT DOCUMENTS

GB 2443635 A * 5/2008

(Continued)

*Primary Examiner* — Robert Canfield
*Assistant Examiner* — Charissa Ahmad
(74) *Attorney, Agent, or Firm* — Neustel Law Offices

(57) ABSTRACT

A wind turbine system for safe and reliable installation in a building. The Wind Turbine System generally includes of a tower pole having an upper end and a lower end. The upper end of the tower pole includes a wind turbine which extends through the roof through a hole. The lower end of the tower pole includes a tower base which is installed underground in the base of a building. The tower base may be anchored in the ground with a concrete footing. The tower pole is connected to a building support member by a clamp member. An anti-vibration ring surrounds the tower pole at its interface with the building support member to dampen vibrations. A tower-roof seal surrounds the interface between tower pole and roof at the hole. In this manner, wind power can be provided to a building without the use of guyed wires and without damaging the structure of the building.

6 Claims, 8 Drawing Sheets

U.S. PATENT DOCUMENTS

2009/0256360 A1    10/2009    Candelas

FOREIGN PATENT DOCUMENTS

| GB | 2460495 A | * | 12/2009 |
| JP | 2001271738 A | * | 10/2001 |
| JP | 2003035252 A | * | 2/2003 |
| WO | WO 9100399 A1 | * | 1/1991 |
| WO | WO 03067081 A1 | * | 8/2003 |
| WO | WO 2009083704 A1 | * | 7/2009 |

* cited by examiner

WIND TURBINE SYSTEM

CROSS REFERENCE TO RELATED APPLICATIONS

I hereby claim benefit under Title 35, United States Code, Section 119(e) of U.S. provisional patent application Ser. No. 61/151,017 filed Feb. 9, 2009. The 61/151,017 application is currently pending. The 61/151,017 application is hereby incorporated by reference into this application.

STATEMENT REGARDING FEDERALLY SPONSORED RESEARCH OR DEVELOPMENT

Not applicable to this application.

BACKGROUND OF THE INVENTION

1. Field of the Invention

The present invention relates generally to a wind turbine and more specifically it relates to a wind turbine system for safe and reliable installation in a building.

2. Description of the Related Art

Any discussion of the related art throughout the specification should in no way be considered as an admission that such related art is widely known or forms part of common general knowledge in the field.

Small wind turbine systems, which are generally defined as 100 kilowatts in capacity or lower, are designed to be installed at homes, farms and small businesses either as a source of backup electricity or to offset use of utility power and reduce electricity bills. A small wind turbine system rated in the range of 5-10 kilowatts would be required to provide a significant contribution for an average American home, which consumes approximately 10,000 kilowatt-hours of electricity per year. However, small wind turbine systems are currently primarily being used in rural homes and farms due to the large space required for tower installation (property size of half acre or more is desirable), while residential and business sectors have been more inclined to pursue solar power options for alternative energy needs.

Conventional ground based wind turbine systems typically include towers which generally fall into one of two categories: self-supporting (free standing) or guyed. A self-supporting tower has a large base, is constructed of larger scaffolding, and requires a large and expensive concrete foundation. A guyed tower is typically supported by guy wires, which tend to be obstructive and occupy large space.

Recently efforts have been made to address the space limitation of conventional ground based wind turbine systems by mounting a wind turbine on the rooftop or edge of a building. However, several problems have become apparent through use of such rooftop installations of wind turbine systems. Vibrations from the turbine may be transferred to the building structure, which can lead to noise and structural problems with the building. Further, when the turbine is installed on a rooftop or attached to a building, the roof base or building wall bearing the weight of the wind turbine system is much weaker compared to a ground base. This problem can create significant risks when the wind turbine system is subjected to extreme weather conditions such as a strong wind force. The weight of the wind turbine system also limits the capacity of a rooftop installation based system, in that the wind turbine itself must be limited to a specific weight (typically micro turbines are used with a capacity equal to or less than 1 kilowatt). Finally, wind turbulence on rooftops may cause problems with the normal operation of the system and significantly reduce the life of the turbine. Wind turbulence causes excessive wear and tear to the wind turbine and turbulent air flow can result in low efficiency in terms of converting energy to electricity as the constantly changing wind direction causes the wind turbine rotor to chase the wind rather than generating electricity from the wind. To minimize this impact; the rotor of the wind turbine must be positioned well above the roof line, which may not always be possible given the weak support from the building roof structure.

Because of the inherent problems with the related art, there is a need for a new and improved wind turbine system that does not suffer from the drawbacks associated with conventional ground based installations and rooftop installations of wind turbine systems.

BRIEF SUMMARY OF THE INVENTION

The general purpose of the present invention is to provide a wind turbine system that has many of the advantages of the rooftop and conventional ground based installations mentioned heretofore. The invention generally relates to a wind turbine system which includes of a tower pole having an upper end and a lower end. The upper end of the tower pole includes a wind turbine which extends through the roof through a hole. The lower end of the tower pole includes a tower base which is installed underground in the base of a building. The tower base may be anchored in the ground with a concrete footing. The tower pole is connected to a building support member by a clamp member. An anti-vibration ring surrounds the tower pole at its interface with the building support member to dampen vibrations. A tower-roof seal surrounds the interface between the tower pole and roof at the hole. In this manner, wind power can be provided to a building without the use of guyed wires and without damaging the structure of the building.

There has thus been outlined, rather broadly, some of the features of the invention in order that the detailed description thereof may be better understood, and in order that the present contribution to the art may be better appreciated. There are additional features of the invention that will be described hereinafter and that will form the subject matter of the claims appended hereto. In this respect, before explaining at least one embodiment of the invention in detail, it is to be understood that the invention is not limited in its application to the details of construction or to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting.

The present invention may have the following advantages compared to conventional ground based systems and rooftop based systems:

The present invention does not need to use guy wires for support and thus can be installed in homes with smaller property sizes.

The present invention reduces costs when compared to conventional ground based systems by using the existing base of a building structure to form the base for the tower, thus alleviating customers of the need to purchase materials and labor for constructing a separate tower base as required by conventional installations.

The present invention increases neighborhood acceptance due to its safe design and limited obstruction of public view.

The present invention reduces vibration and noise (caused by vibration) and eliminates damage to the building from vibration when compared to conventional rooftop based system, because the vibration from wind turbine can be transferred to and absorbed by the ground and dampened by the anti-vibration ring.

The present invention is capable of a larger system capacity than conventional rooftop based systems because of the stronger support to the system from the ground.

The present invention provides flexibility on tower height that is not present when attempting to coutnerbalance the weight of the turbine system with the structural weakness of the building or rooftop it is being installed on with conventional systems. With the tower based on the ground, the wind turbine may be positioned much higher to ensure a safe distance above roof for blades and capture more wind power Other advantages of the present invention will become obvious to the reader and it is intended that these advantages are within the scope of the present invention. To the display of the above advantages, this invention may be embodied in the form illustrated in the accompanying drawings, attention being called to the fact, however, that the drawings are illustrative only, and that changes may be made in the specific construction illustrated and described within the scope of the present invention.

BRIEF DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein.

DETAILED DESCRIPTION OF THE INVENTION

A. Overview

Figure 1:
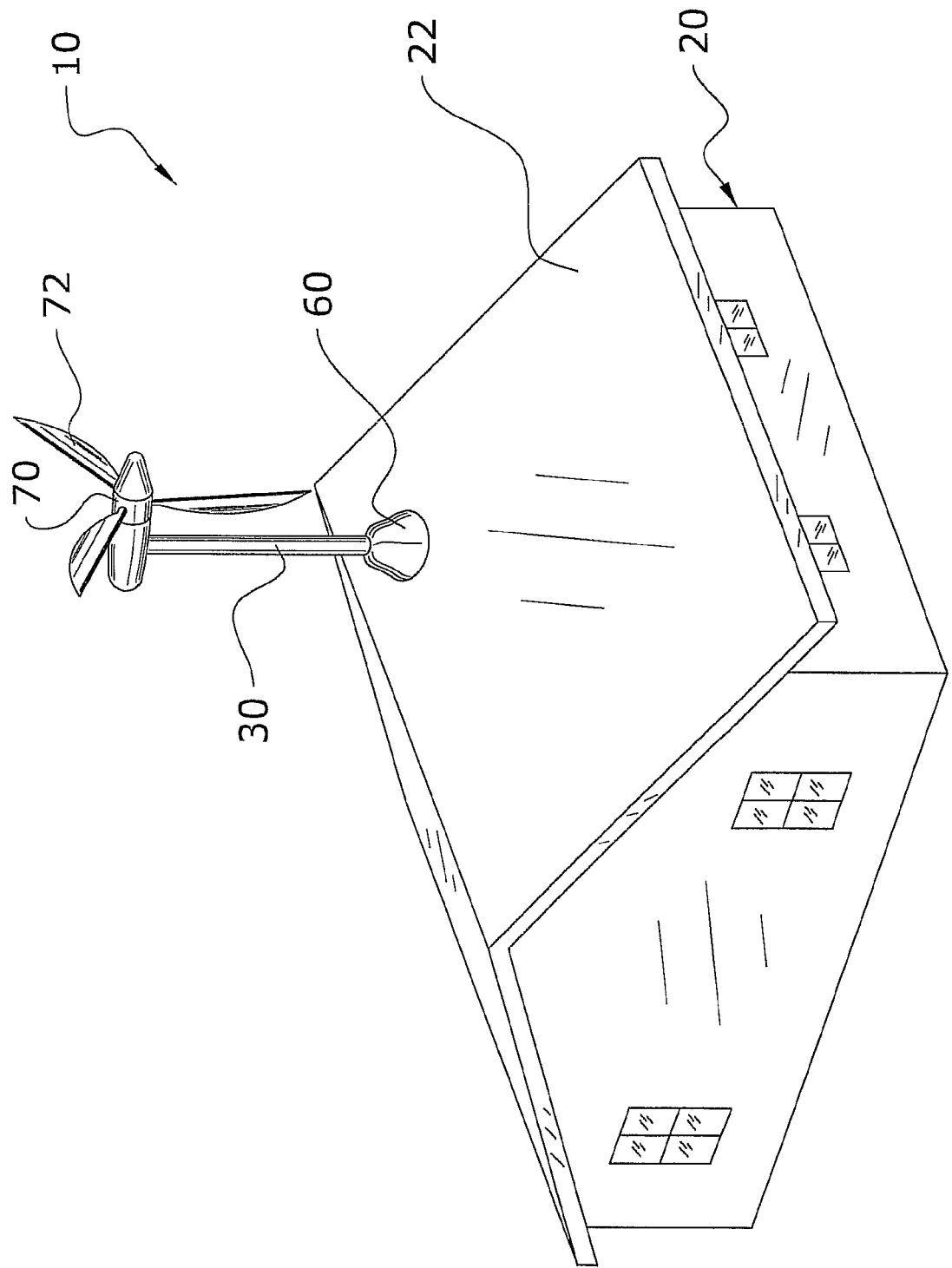
FIG. 1 is an upper perspective view of the present invention installed on a home having a sloped roof.

Turning now descriptively to the drawings, in which similar reference characters denote similar elements throughout the several views, the figures illustrate a wind turbine system 10 generally comprised of a tower pole 30 having an upper end 31 and a lower end 33. The upper end 31 of the tower pole 30 includes a wind turbine 70 which extends through the roof 22 through a hole 24. The lower end 33 of the tower pole 30 includes a tower base 32 which is installed underground in the base of a building 20. The tower base 32 may be anchored in the ground with a concrete footing 34. The tower pole 30 is connected to a building support member 26 by a clamp member 40. An anti-vibration ring 50 surrounds the tower pole 30 at its interface with the building support member 26 to dampen vibrations. A tower-roof seal 60 surrounds the interface between the tower pole 30 and the roof 22 at the hole 24. In this manner, wind power can be provided to a building 20 without the use of guyed wires and without damaging the structure of the building 20.

B. Building

FIG. 1 illustrates one embodiment of a building 20 which may be utilized with the present invention. Various types of buildings 20 may be outfitted with the present invention and the building 20 may be comprised of various structures, including residential homes, garages, commercial buildings or industrial buildings.

The building 20 may be comprised of a new construction or a previously existing structure and may be constructed of various materials. The overall design of the building 20 may vary without affecting the overall operation of the present invention and is not limited to those designs illustrated herein. The building 20 may have various levels so long as the interface between the tower pole 30 of the present invention and the ceiling at every floor allows additional space for the installation of an anti-vibration ring 50 to accommodate for possible slight movement of the tower pole 30 due to wind striking the wind turbine 70.

The wind turbine system 10 may be installed in various locations within various types of buildings. For example, in a preexisting home in a residential area, the wind turbine system 10 may be installed in a garage so as to minimize its impact on the existing architecture of the home. Alternatively, the wind turbine system 10 could be installed with the tower base 32 located in a chimney, which typically has an empty channel for the tower pole 30 to extend through without obstruction. In such an embodiment, materials utilized with the wind turbine system 10 would be comprised of fireproof materials, electrical wires would be rerouted for safety, and the chimney top would be modified to allow the tower pole 30 to protrude therethrough. In a further embodiment, the wind turbine system 10 may be installed with the tower base 32 located near a wall outside a building 20 and the tower pole 30 mounted to the wall.

Figure 6:
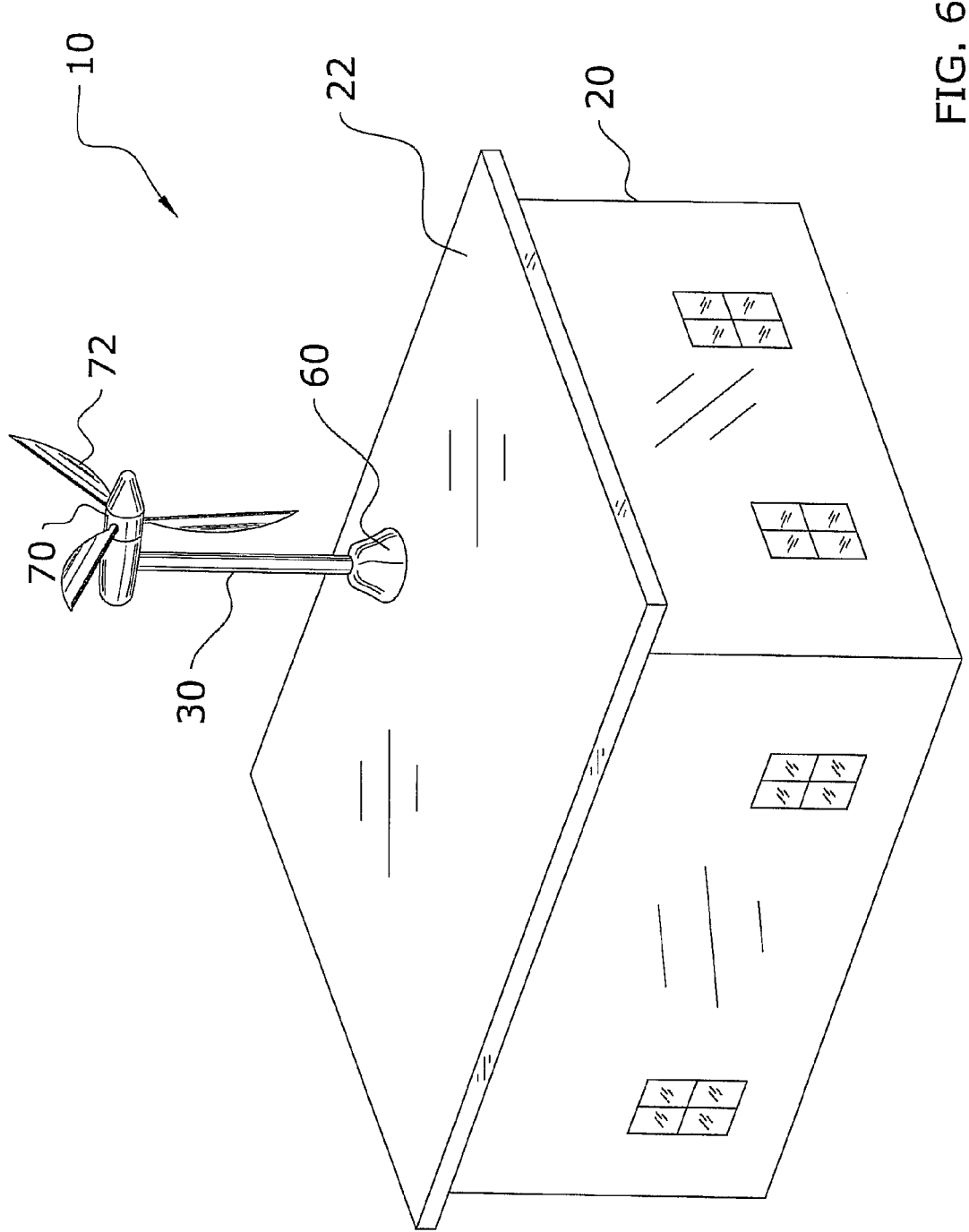
FIG. 6 is an upper perspective view of the present invention installed on a home having a flat roof.

The building 20 will generally include a roof 22. The roof 22 may be comprised of various designs and materials without affecting the overall operation of the present invention. The roof 22 may be sloped or flat, as shown in FIG. 1 and FIG. 6. It is also appreciated that the present invention may be used with buildings 20 which do not include a roof 22. In such an embodiment, the tower pole 30 could be attached directly to a building support member 26 and extend upwardly from the building 20 without having to pass through a roof hole 24.

Figure 2:
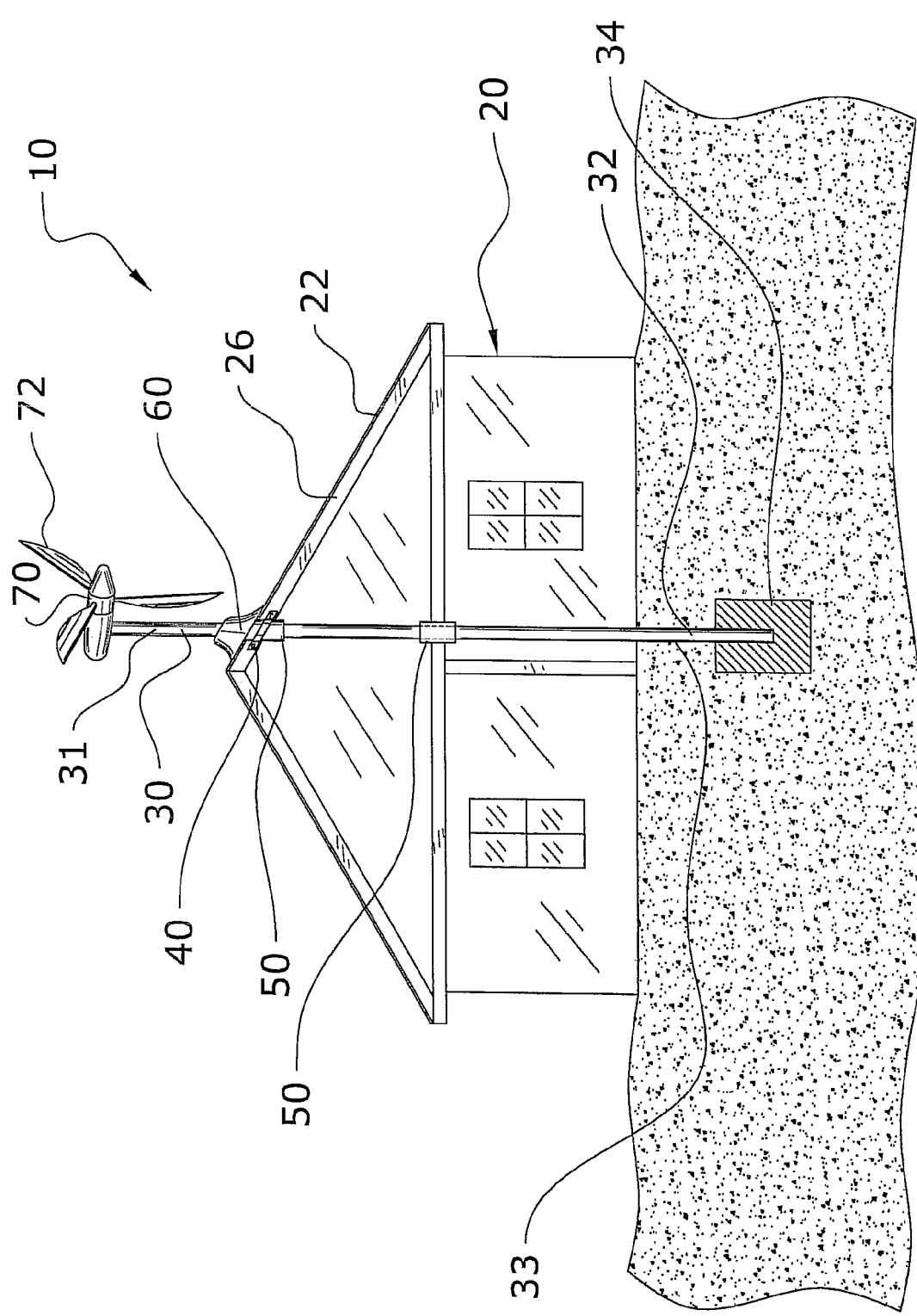
FIG. 2 is a side view of the present invention installed on a home having a sloped roof.
Figure 3:
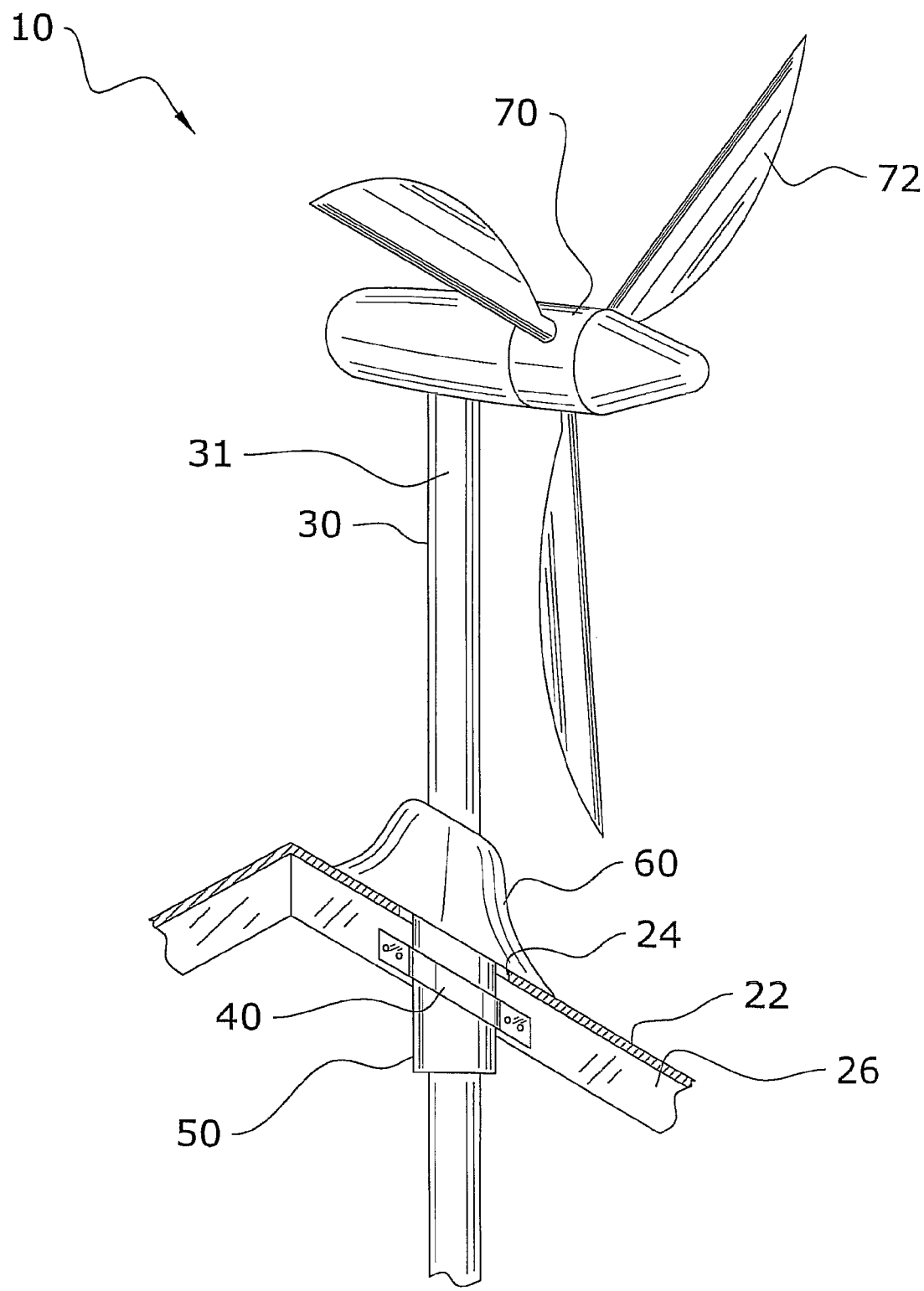
FIG. 3 is a side cutaway view of the interface between the tower pole and the roof.
Figure 4:
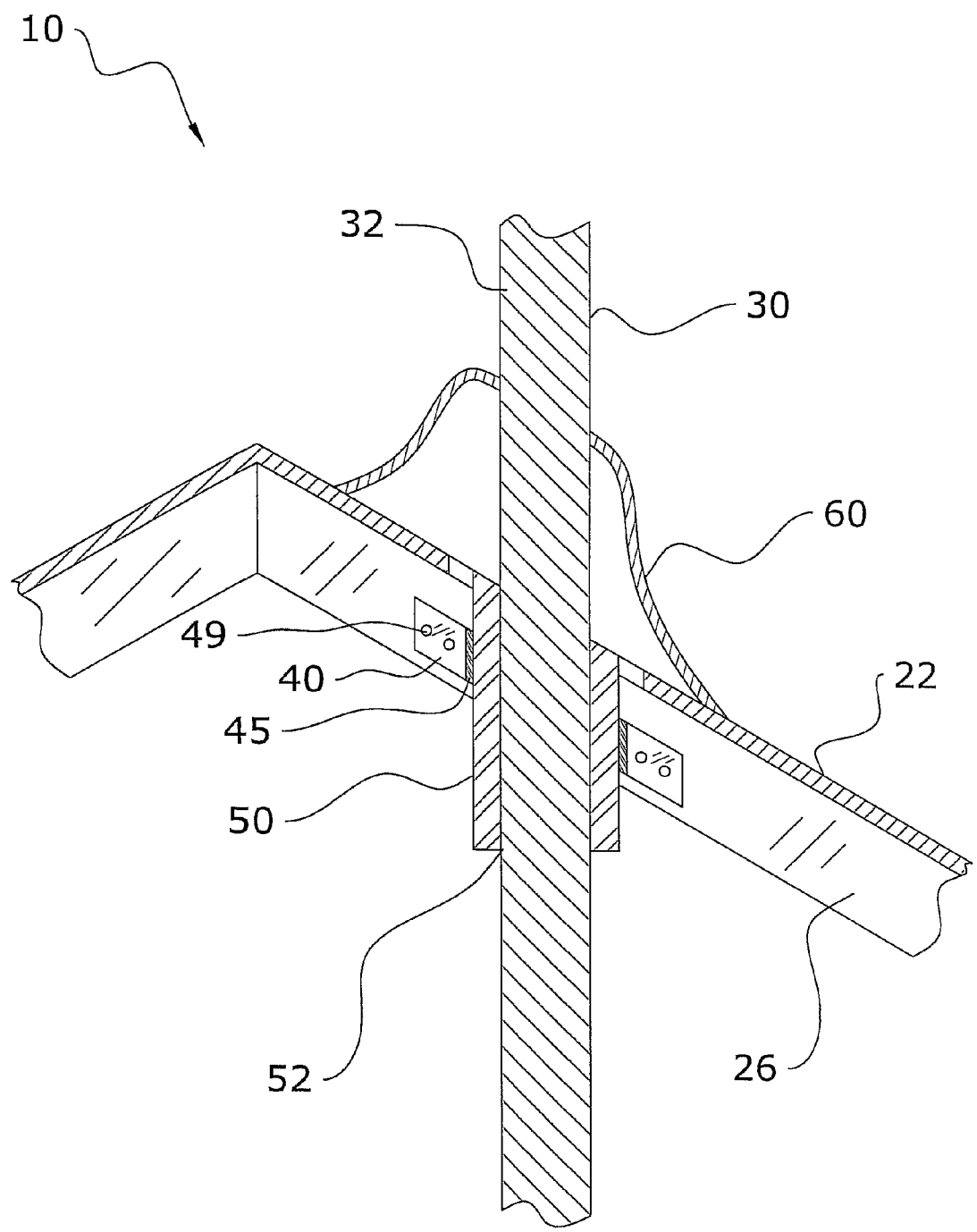
FIG. 4 is a side cutaway view of the interface between the tower pole and the roof.

The roof 22 will generally include a hole 24 for use with the present invention. The hole 24 is preferably located at a point which will allow the tower pole 30 to be placed upright at a right angle to the ground while connected to the building support member 26 by a clamp member 40. The diameter of the roof hole 24 is preferably greater than the diameter of the tower pole 30 so as to allow an anti-vibration ring 50 to be installed around the tower pole 30 and to ensure additional space is available for the safe movement of the tower pole 30 within the hole 24 as shown in FIG. 2, FIG. 3, and FIG. 4.

The roof 22 will generally include at least one building support member 26. The building support member 26 may be comprised of a truss, rafter, or roof support beam. The building support member 26 may be constructed of various materials, though it is preferable that the building support member 26 be constructed of a material which is stronger than the roof 22 for optimal operation of the present invention.

It is preferable that the building support member 26 be adapted to provide sufficient support for the wind turbine system 10 to be installed and operated without damaging the structure of the building 20. If the building support member 26 provides sufficient support (depending on the material strength and thickness), guyed wires are not necessary for the present invention to properly function.

Figure 7:
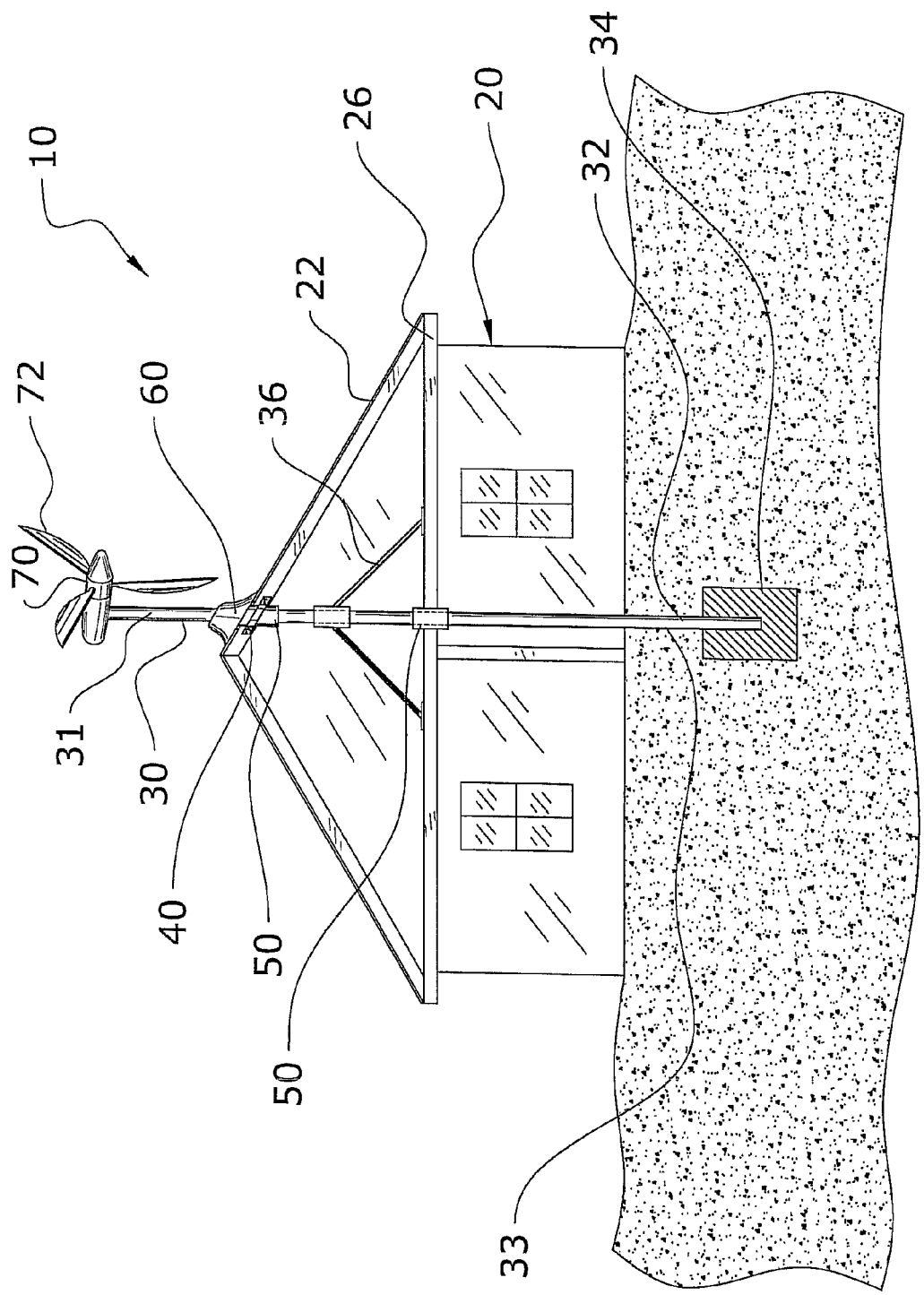
FIG. 7 is a side view showing an alternate embodiment of the present invention which includes additional pole support members for increased stability.

It is appreciated that, in some embodiments of the present invention, additional support may be provided through use of one or more pole support members 36. Such an embodiment is illustrated in FIG. 7. Various types of pole support members 36 may be utilized which act to provide additional support for the tower pole 30 when installed in the building 20, but in a preferred embodiment guyed wires 36 may be utilized as pole support members 36. In such an embodiment, the material strength requirements for the guyed wires 36 are less than what is normally required for a traditional guyed tower.

The pole support members 36 will generally be attached at one end to a building support member 26 and at another end to the tower pole 30. In a preferred embodiment, guyed wires 36 are attached to the building support members 26 that can provide the strongest support within the surrounding building 20 structure. For buildings 20 which include a sloped roof 22, the guyed wires 36 may be hidden within the attic of the building 20 to minimize the visual impact as shown in FIG. 7. If the guyed wires 36 are utilized with a flat-roofed building 20, they will likely be visible when viewing the building 20 from outside. However, the guyed wires 36 will be easier to attach to the building 20 and may appear more decorative for the tower pole 30 extending through the flat roof 22.

C. Tower Pole

Figure 5:
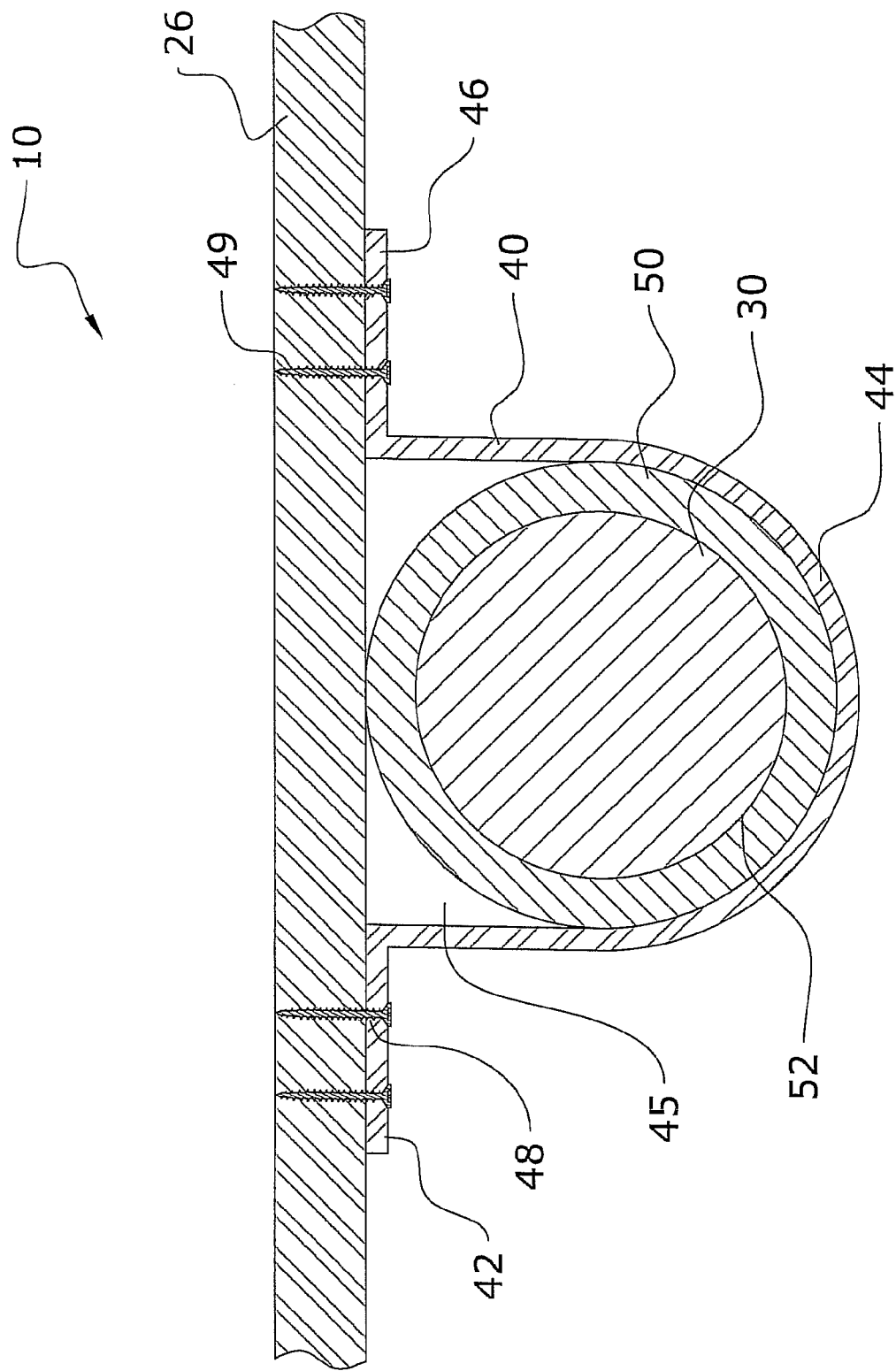
FIG. 5 is a top cutaway view of the interface between the tower pole, anti-vibration ring, and building support member.

The tower pole 30 of the present invention is generally comprised of an elongated pole used to support the wind turbine 70 of the present invention. It is preferable that tower pole 30 have a circular cross-section as shown in FIG. 5. However, it is appreciated that tower pole 30 may be comprised of various cross-sections and materials so long as tower pole 30 is durable enough to not affect the stability or operation of the wind turbine system 10.

The tower pole 30 may be comprised of a unitary structure or of a plurality of tower pole 10 portions which are securely interconnected Tt is preferable that at least the portion of the tower pole 30 which extends above the roof be adapted to withstand exposure to the elements, including wind and rain.

The tower pole 30 will generally include an upper end 31 and a lower end 33. The upper end 31 of the tower pole 30 will generally include a wind turbine 70 attached thereto. The wind turbine 70 may be fixedly attached or removably attached to the upper end 31 of the tower pole 30, depending on the needs of the operator. It is preferable that the wind turbine 70 be removably attached to the upper end 31 of the tower pole 30 to ease maintenance and/or replacement.

The lower end 33 of the tower pole 30 will generally act as a tower base 32. The tower base 32 is comprised of a portion of the tower pole 30 which is buried under the ground to a sufficient depth to allow stability of the tower pole 30 after installation. The positioning of the tower base 32 underground within the same base as building 20 provides strong ground support and allows the wind turbine 70 to be located at a greater height than with a typical rooftop installation.

It is preferable to have a concrete footing 34 for the tower base 32 to secure it in place as shown in FIG. 2. The volume of the concrete footing 34 should be smaller than that of the footing required for prior art self-supporting towers as the tower pole 30 can receive additional support from the building support member 26. According to the Lever Principle, the greater distance between the roof support member 26 and the ground level, the better support the tower pole 30 will receive. Accordingly, a smaller volume of concrete for the concrete footing may be utilized. Therefore the volume saving of the concrete footing volume (compared to self-supporting tower) can be depended on the strength and height (from ground level) of the building support member 26.

The tower pole 30 is preferably placed perpendicular to ground level as shown in FIG. 2. The tower pole 30 will generally be placed along a pathway that does not cause any potential damage to the structure of the building 20. At least one point of the tower pole 30 will be located close to a building support member 26 so as to provide a convenient mounting location for the tower pole 30.

D. Clamp Member

The tower pole 30 will generally be connected to a building support member 26 by a clamp member 40. The clamp member 40 of the present invention is generally comprised of a metal bracket adapted to surround the anti-vibration ring 50 and attached by threaded fasteners 49 to the building support member 26 as shown in FIG. 5.

In a preferred embodiment, the clamp member 40 will include a first portion 42, a middle portion 44 having an opening 45 defined therein and a second portion 46 as shown in FIG. 5. The first portion 42 of the clamp member 40 will generally be comprised of a flat piece of material such as metal which includes one or more apertures 48 thereon through which one or more fasteners 49 may be extended to removably attach the first portion 42 of the clamp member 40 to the building support member 26.

The middle portion 44 of the clamp member 40 will generally be comprised of a arc configuration which extends outwardly from the first portion 42 and second portion 46 as shown in FIG. 5. The middle portion 44 will generally be adapted to extend around the anti-vibration ring 50 of the present invention. The middle portion 44 will preferably include an opening 45 through which the anti-vibration ring 50 and tower pole 30 may both extend in a slotted configuration. The opening 45 of the middle portion 44 of the clamp member 40 will preferably be of a diameter which is slightly larger than the diameter of the anti-vibration ring 50 and tower pole 30 so that the opening 45 may snugly fit around both the ring 50 and pole 30.

The second portion 46 of the clamp member 40 will generally be comprised of a flat piece of material such as metal which extends away from the middle portion 44 in a direction opposite that of the first portion 42. The second portion 46 of the clamp member 40 will generally include nne nr more apertures 48 thereon through which one or more fasteners 49 may be extended to removably attached the second portion 46 of the clamp member 40 to the building support member 26.

However, it should be appreciated that the clamp member 40 may be comprised of various materials and designs so long as it provides sufficient support for the tower pole 30 and the anti-vibration ring 50 and is capable of a secure connection with the building support member 26.

E. Anti-Vibration Ring

An anti-vibration ring 50 will generally surround the tower pole 30 at its mounting location with the building support member 26 as shown in FIG. 2, FIG. 3, and FIG. 4. The anti-vibration rings 50 of the present invention acts to dampen vibrations caused by the wind turbine 70 and prevent damage to the building 20, roof 22 and building support member 26. The anti-vibration ring 50 additionally reduces the noise that is caused by vibration.

The anti-vibration ring 50 of the present invention will generally be comprised of a circular structure having an opening 52 therein for extending around the tower pole 30 of the present invention. The anti-vibration ring 50 may be comprised of various designs and vibration dampening materials. The anti-vibration ring 50 will preferably be comprised of a diameter which allows a snug fit for the tower pole 30 and the opening 45 of the clamp member 40. The opening 52 of the anti-vibration ring 50 will preferably be of a diameter which is slightly larger than that of the tower pole 30 and slightly smaller than that of the opening 45 of the clamp member 40.

It is preferable that an anti-vibration ring 50 be placed at any location where the tower pole 30 comes into direct contact with the building 20 via building support members 26 as shown in FIG. 2. The anti-vibration ring 50 will preferably be positioned at the location of the roof hole 24 to prevent damage to the roof 22 from vibrations in the tower pole 30.

F. Tower-Roof Seal

A tower-roof seal 60 will generally cover the interface between the roof 22 and the tower pole 30 at the roof hole 24 as shown in FIGS. 1 and 6. The tower-roof seal 60 preferably is comprised of a durable material such as synthetic rubber roofing material which extends around the tower pole 30 while covering its interface with the roof hole 24. It is also appreciated that the tower-roof seal 60 may be comprised of various materials and designs so long as it can seal the interface between the tower pole 30 and the roof 22 and allow slight movement of tower pole 30 so that leaking through roof hole 24 may be prevented.

It is preferable that the material for the tower-roof seal 60 have enough flexibility so that it may continuously re-shape itself in the vibrating environment. It is also preferable that tower-roof seal be able to withstand exposure to the elements. After installation, it is preferable to seal the tower-roof seal with a sealant or caulk to prevent leaking of water into the building 20 or roof 22.

The position of the center of the tower-roof seal 60 is preferably higher than the roof 22 to allow a flexible space between the tower-roof seal 60 and the roof 22 so that the tower-roof seal 60 may accommodate for the slight movement of the tower pole 30 without damaging itself or loosening the sealing.

G. Wind Turbine

Figure 8:
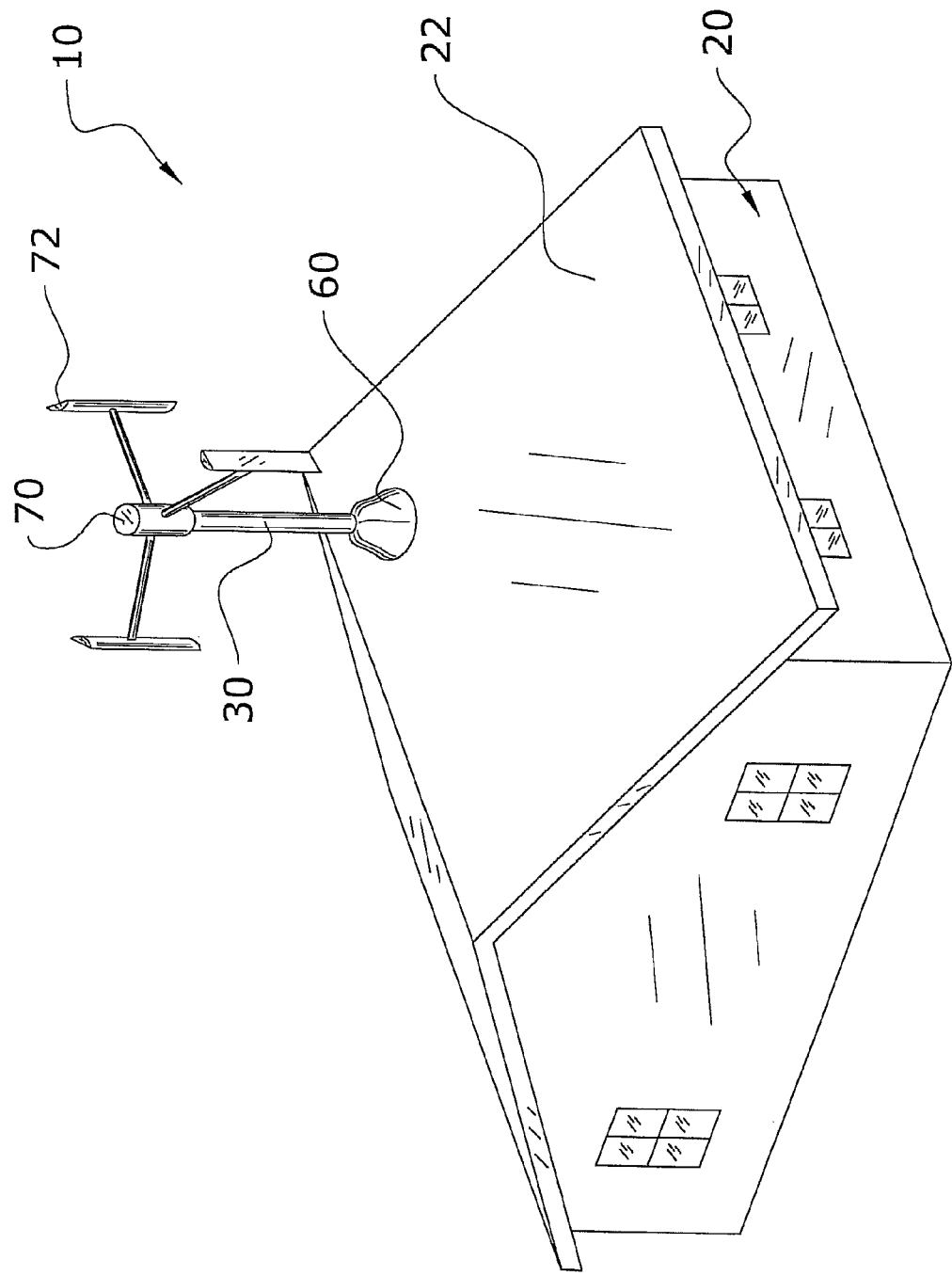
FIG. 8 is an upper perspective view of an embodiment of the present invention which utilizes a Vertical Axis Wind Turbine.

The wind turbine 70 is generally comprised of a turbine which converts wind power into energy. The wind turbine 70 may be comprised of a windmill configuration as shown in FIG. 1, or of various other configurations so long as it effectively generates wind power. The wind turbine 70 may be comprised of a horizontal axis wind turbine, as shown in FIGS. 1-7. In an alternate embodiment as shown in FIG. 8, the wind turbine 70 may alternatively be comprised of a vertical axis wind turbine. The wind turbine 70 is preferably installed at the upper end 31 of the tower pole 30 as shown in FIG. 3.

The wind turbine 70 should be located at a sufficient height such that its blades 72 will be well above the roof 22 or other obstructions. Placement of the wind turbine 70 at a greater height may allow the wind turbine system 10 to capture more wind power under steady high-speed wind environments.

The wind turbine 70 will generally include electrical connections such as wires which are connected to the existing electrical system of the building 20 in a grid-tied or off-grid manner. The wires may connect through a passageway within the tower pole 30 or through a different channel. It is preferable that insulation be used between wires and the inside of the tower pole 30 to minimize noise that may be produced by movement of the wires within the tower pole 30. An opening may be located on the tower pole 30 to allow the wires to exit tower pole 30 and connect to the electrical system of building 20.

H. Operation of Preferred Embodiment

In use, the tower base 32 is buried within the base of the building 20 at a sufficient depth to provide support for the tower pole 30. The concrete footing 34 is used to secure the tower base 32 in place. The tower pole 30 is connected to the building support member 26 with the clamp member 40 and passes through the roof hole 24. An anti-vibration ring 50 is placed between the tower pole 30 and the clamp member 40 to dampen vibrations. Additional anti-vibration rings 50 may also be placed at any location where the tower pole 30 comes in direct contact with the building 20. The tower-roof seal 60 is placed to cover the interface between the tower pole 30 and roof 22 and sealant is utilized to prevent leaks. A wind turbine 70 is installed at the upper end 31 of the tower pole 30, and electrically connected to the electrical system of building 20. The wind turbine system 10 may now be utilized to convert wind power to energy, thus providing power to the building 20.

Unless otherwise defined, all technical and scientific terms used herein have the same meaning as commonly understood by one of ordinary skill in the art to which this invention belongs. Although methods and materials similar to nr equivalent to those described herein can be used in the practice or testing of the present invention, suitable methods and materials are described above. All publications, patent applications, patents, and other references mentioned herein are incorporated by reference in their entirety to the extent allowed by applicable law and regulations. In case of conflict, the present specification, including definitions, will control. The present invention may be embodied in other specific forms without departing from the spirit or essential attributes thereof, and it is therefore desired that the present embodiment be considered in all respects as illustrative and not restrictive. Any headings utilized within the description are for convenience only and have no legal or limiting effect.

The invention claimed is:
1. A wind turbine system, comprising:
 a building including a roof and at least one building support member, wherein said roof includes at least one hole;
 a tower pole attached to said at least one building support member, wherein a lower end of said tower pole is buried in the ground beneath said building, wherein an upper end of said tower pole extends through said at least one hole in said roof, wherein said tower pole is removably attached to said at least one building support member by at least one clamp member, wherein said at least one clamp member includes an opening through which said tower pole extends, wherein said at least one clamp member includes at least one aperture, wherein said at least one clamp member is removably attached to said at least one building support member through use of at least one fastener extending through said at least one aperture; and a wind turbine attached to said upper end of said tower pole.

2. The wind turbine system of claim 1, further comprising a concrete footing extending around said lower end of said tower pole.

3. The wind turbine system of claim 1, further comprising an anti-vibration ring surrounding said tower pole for dampening vibrations.

4. The wind turbine system of claim 3, wherein said anti-vibration ring is sandwiched between said tower pole and said clamp member.

5. The wind turbine system of claim 1, further comprising a tower-roof seal covering the interface between said tower pole and said roof hole.

6. A wind turbine system, comprising:
- a building including a roof and at least one building support member, wherein said roof includes at least one hole;
- a tower pole attached to said at least one building support member, wherein a lower end of said tower pole is buried in the ground beneath said building, wherein an upper end of said tower pole extends through said at least one hole in said roof;
- wherein said tower pole is removably attached to said at least one building support member by at least one clamp member, wherein said at least one clamp member includes an opening through which said tower pole extends, wherein said at least one clamp member includes at least one aperture, wherein said at least one clamp member is removably attached to said at least one building support member through use of at least one fastener extending through said at least one aperture, wherein said at least one clamp member includes a first portion, a middle portion and a second portion, wherein said first portion extends away from said middle portion in a direction opposite of said second portion, wherein said at least one aperture of said at least one clamp member is comprised of a first aperture located on said first portion of said at least one clamp member and a second aperture located on said second portion of said at least one clamp member;
- an anti-vibration ring surrounding said tower pole for dampening vibrations;
- a tower-roof seal covering the interface between said tower pole and said roof hole;
- a concrete footing extending around said lower end of said tower pole; and
- a wind turbine attached to said upper end of said tower pole.

* * * * *